United States Patent Office 3,520,823
Patented July 21, 1970

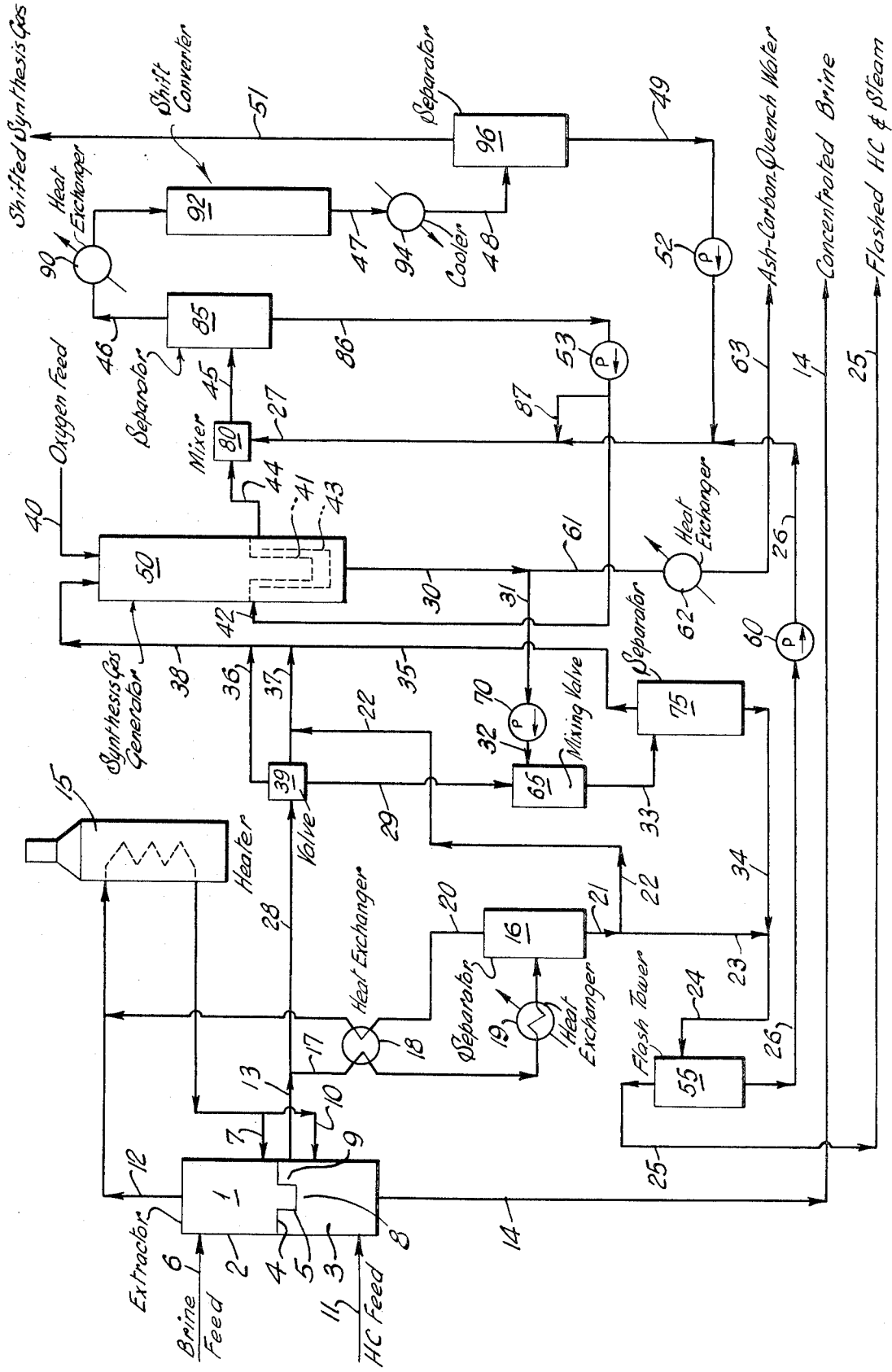

3,520,823
SYNTHESIS GAS PROCESS
William L. Slater, La Habra, Calif., assignor to Texaco Inc., New York, N.Y., a corporation of Delaware
Filed Apr. 24, 1967, Ser. No. 633,147
Int. Cl. C07c 1/02; C01b 2/02, 2/30
U.S. Cl. 252—373                                                1 Claim

ABSTRACT OF THE DISCLOSURE

A synthesis gas process comprising contacting saline water with hot hydrocarbon liquid to produce a hydrocarbon-water complex containing about 10 to 50 percent desalted water, and feeding a portion of said complex into a partial oxidation generator to produce a hot effluent stream comprising carbon monoxide, hydrogen, and entrained carbonaceous solid. Said hot effluent stream is cooled with quench water in which the unconverted carbon forms a dispersion. Another portion of said complex is added to said quench water to absorb the carbonaceous solids and to form a carbon-complex slurry which is separated from the quench water and fed to the generator. Mineral-free water, which separates out upon cooling a portion of said complex, is added to the quench water system as makeup and to satisfy the water requirements for a subsequent carbon monoxide shift reaction.

---

This invention relates to the conversion of liquid hydrocarbons to gaseous products comprising carbon monoxide and hydrogen, or synthesis gas, and entrained carbonaceous solid. This process makes possible the economical operation of a synthesis gas generator in regions devoid of mineral-free water but having an abundant supply of low cost river or saline water which would be, ordinarily, unsuitable for chemical processing.

In one of its more specific aspects, the invention is directed to a gasification process wherein a hydrocarbon-water complex is partially oxidized in a generator to produce hot synthesis gas. The hydrocarbon-water complex is formed by contacting saline water with a hot hydrocarbon liquid, characterized by its high selectivity for water rather than for salt, and a water solubility that is highly sensitive to temperature, for example, petroleum hydrocarbon liquids which dissolve about 10 to 50 percent by weight of desalted water at high temperature (about 500–650° F.) and release the water upon cooling. Heat to effect this extraction may be recovered from the generator effluent gas stream. To prevent vaporization of the liquid in the extraction zone, pressures are maintained high (about 1500–2650 p.s.i.g.). The saline water raffinate, with increased salt content, may be discarded or further processed to recover the minerals.

In another specific embodiment, a portion of the hydrocarbon water complex is decomposed into a mineral-free water phase and a hydrocarbon phase by reducing the temperature of the complex by at least 30° F. The hydrocarbon phase which separates is heated and recycled to the extractor in a continuous process to form additional complex and mineral-free water. The water phase from the decomposed complex, after separation, is used to satisfy diverse requirements in the process for mineral-free water. For example, a portion of this water may be mixed with a portion of said complex to dilute the liquid feed to the generator; or a portion may be mixed with the quench water to cool the generator effluent gas stream; or a portion may provide the steam requirements for a subsequent carbon monoxide shift conversion step to yield additional hydrogen.

In still another embodiment, a portion of the hydrocarbon-water complex is used to effect resolution of the dispersion of carbonaceous solid in the quench water.

The importance of an efficient process for the production of synthesis gas for use in the production of ammonia and related fertilizer products has been emphasized by the recent growth in the world's food requirements. Also, demand for hydrogen from synthesis gas for petroleum and petrochemical processes such as hydrotreating, hydrodesulfurization, and hydrocracking has increased as has the demand for methanol and other chemicals made by the vapor phase synthesis from mixtures of hydrogen and carbon monoxide.

Carbon monoxide and hydrogen, or synthesis gas, may be economically produced in quantity by the partial oxidation of hydrocarbon liquids. In the known partial oxidation processes, a liquid hydrocarbon is reacted in a non-catalytic flame with an oxygen-rich stream at an autogenously maintained temperature within the range of about 1800–3500° F., preferably about 2200–2800° F. and a pressure within the range of about 100 to 2600 p.s.i.g. Mineral-free water is introduced into the reaction zone to assist in control of the reaction temperature and as a reactant to increase the relative amount of hydrogen produced.

The present invention makes it possible to exercise better control over the quality, quantity, and the physical form of the $H_2O$ in the feed stock—the preferred amount being in the range of about 0.2 to 1 lb. of water per lb. of hydrocarbon liquid. Usually, low $H_2O$ to hydrocarbon ratios are desired for excess water favors high residual methane. In such instance, to maintain the same temperature in the generator, more oxygen must be consumed and this lowers the soot make. More methane gives a lower hydrogen purity; more oxygen consumed requires a larger, costly oxygen plant; and a design soot make lower than 1–2 percent may be insufficient to sequester metal flux compounds, thereby shortening the life of the refractory lining the generator. However, high temperatures resulting from insufficient $H_2O$ will also shorten the life of the refractory lining. The reactants are usually preheated to a temperature of about 500–700° F. Unburned carbon appears as very fine particles in the hot effluent gas stream from the reaction zone. Removal of the entrained carbon from the product gas and recycling the carbon to the generator as feed, as well as recovering heat from the hot effluent gas from the generator are important features in the process of the invention. The desalination step is another advantage, wherein the requirements for mineral-free water in the process are satisfied by desalting readily available low-cost saline water such as sea water. For example, should the synthesis gas from the gas generation step be used as feed stock in a subsequent water gas shift process, then steam to supply that consumed in such a process is also provided in the process of the invention.

The use of liquid hydrocarbon feed stocks and their cheap transportation make this process attractive in areas where natural gas is not available in appreciable quantities. Operating the process at high pressure offers savings in compression costs of the product gas, efficient heat utilization, and smaller process equipment.

In accordance with the process of this invention a hydrocarbon liquid, characterized by its ability to extract more water at a high temperature than at a lower temperature, and brine are brought together in an extraction column at high temperature (about 400° F. or above) and pressure (about 1500–2650 p.s.i.g.) to form a hydrocarbon-water complex substantially free from inorganic compounds. The term "brine" is used in a broad sense to denote the entire range of concentrations of water soluble inorganic compounds in water, for example, natural saline water containing sodium chloride, including brackish water, sea water, and saturated or nearly saturated brines, such as the brine in Great Salt Lake or brines obtained from wells. In addition to sodium chloride containing solutions, other brines to which the process may be applied include aqueous solutions of dissolved mineral salts, for example, halides, carbonates, and sulfates of sodium, potassium, lithium, cadmium, magnesium, zinc and copper.

Almost any hydrocarbon suitable for charging a synthesis gas generator may be used in the process of this invention, including: butane, pentane, hexane, benzol, toluol, natural gasoline, gasoline, naphtha, gas oil, residual fuel, reduced crude, whole crude, coal tar oil, shale oil, and tar sand oil. For practical purposes hydrocarbons which are liquid at complex-forming conditions are preferred.

The term "complex" is used herein to designate the solution of water in hydrocarbon liquid; especially the extract leaving the extraction zone, since it is not entirely certain at this time whether it is a true solution of water in hydrocarbon liquid or a hydrocarbon solution containing a hydrate of the water and hydrocarbon. The exact solvation mechanism by which the hydrocarbon liquid extracts salt-free water from the brine and the structural configuration formed when this mineral-free water is bonded to the hydrocarbon liquid to form the complex is not known. Polarity and hydrogen bonding offer a plausible basis for the phenomenon. Whereas hydrogen bonding probably plays no significant role in connection with the solubilization of water in hydrocarbons, it is perhaps one of the reasons why salts remain in the aqueous phase and do not dissolve in the water-hydrocarbon complex. High temperature decreases the polarity of water so that it becomes more like that of a hydrocarbon and therefore the solubility of the water in the hydrocarbon is increased. The solubility of hydrocarbon in water is only a fraction of that of water in hydrocarbons. For example, at 250° C. the solubility of water in petroleum oil is 30 mol percent, whereas the solubility of petroleum oil in water is only .04 mol percent. It is interesting to note that the solubility of water in straight-run petroleum fractions is substantially independent of the molecular weight of the fraction. Solubility of water in hydrocarbon liquids is a direct function of temperature and pressure. Increased temperatures increase the vapor pressure of water which increases its solubility in hydrocarbons. As the temperature increases, the three dimensional molecular structure of water decreases and becomes more chain-like due to dissociation and therefore structurally more like hydrocarbons. This increases solvation for substances dissolve best in others most like them. Since the molecular size of water as an associated material is decreased at high temperature, this also contributes to increased solubility of water in hydrocarbons as temperature is increased.

The hydrocarbon-water complex is immiscible with the residual brine and may be separated therefrom by gravity. After separation, the complex may be fed directly into the gas generator where it is reacted in a non-catalytic flame with an oxidant to produce synthesis gas. There are many advantages in the direct feeding of the complex to the generator rather than feeding separate streams of reactants. The complex is an intimate combination of water and hydrocarbon with molecules of water bonded to molecules of hydrocarbon. Distribution of components in such a combination is superior to any that can be achieved by mechanical mixing. As a result, the reaction efficiency in the generator is improved. Better temperature control is now possible using less water. It also assists in the atomization and burning of the hydrocarbon fuel, producing more carbon monoxide and hydrogen with less carbon formation. Since the complex is supplied to the reaction zone superheated and at high pressure, specific oxygen consumption can be reduced. A single feedstream of the complex eliminates the cost of pre-heating and compressing separate feedstreams, as well as saving the cost of heaters and compressors. By operating at a reduced oxygen to hydrocarbon ratio, the generation of carbon monoxide is favored over the generation of carbon dioxide. Hydrogen yield in the subsequent water-gas shift reaction is therefore improved. A steady feed rate to the generator is easy to achieve with the single stream complex in which the reactants are already present in the desired ratio. The metering and mixing problems with separate feeds are thereby avoided. The ratio of water to hydrocarbon in the complex is controlled to a considerable extent by the extraction temperature. This ratio may be made equal to the desired steam to hydrocarbon ratio in the generator. When necessary, supplemental water or hydrocarbon liquid may be mixed with the complex to adjust lean or rich feed mixtures.

Pressures in the extractor are great enough to keep the feed streams liquid and to offset line drop between the extraction column and the generator. The high temperature and pressure of the complex and its unique physical combination with water, reduces its viscosity. Consequently, pumping is facilitated and piping, fittings and pumping equipment can be made smaller and therefore less expensive. This also permits the processing of low-cost normally viscous hydrocarbons.

In forming the hydrocarbon-water complex an unforeseen advantage of the process of this invention occurs in the extraction step when dissolved water-soluble mineral salts and fine particulate matter in the hydrocarbon liquid are removed by the countercurrent washing with brine.

The solubility of water in hydrocarbon liquid varies with the temperature. Over a temperature range of 400–650° F. and pressure to 2650 p.s.i.g., aromatics are the best solvents for water followed by paraffins, then olefins. For example, at 580° F. o-xylene dissolves 18 wt. percent water, n-decane 13 wt. percent, and propylene tetramer 7 wt. percent. Above 580° F. the solubility increases rapidly, and at 610° F. o-xylene dissolves 30 wt. percent water, n-decane 25 wt. percent and propylene tetramer 18 wt. percent. At 628° F. the o-xylene extract was 40 wt. percent water. Salt in the product water referred to herein as "mineral-free water" was in the case of o-xylene less than 0.01 wt. percent. The unexpected zero distribution coefficient of the salt between the hydrocarbon rich phase and residual brine phase makes feasible the one-stage extraction of pure water from saline waters. This result is more surprising when compared with the super-critical distillation of sea water in which the overhead "steam" phase contains about 7 percent of the salt in solution.

A preferred mode of operation using naphtha and brine is illustrated in the accompanying drawing and described in the following detailed description and specific examples. Although the drawing illustrates a suitable arrangement of apparatus by which the process of this invention may be practiced, it is not intended to limit the invention to the particular apparatus or procedure described in detail hereafter.

With reference to the drawing, extractor 1, operated at a pressure of about 1700–1900 p.s.i.g. and a temperature of 400–650° F., comprises upper chamber 2 and lower chamber 3, separated by transverse trap tray 4. Passage between chambers 2 and 3 in either direction is provided by downcomer 5 in trap tray 4. Brine, at ambient temperature, for example, about 70° F. is delivered through line 6 into the upper part of chamber 2. Downwardly flowing brine from line 6 comes into intimate contact with an upwardly flowing stream of hot hydrocarbon liquid which enters the lower part of chamber 2 through line 7 at a temperature in the range of about 400–650° F. Picking up heat from the hydrocarbon liquid, the brine flows through downcomer 5 and enters lower chamber 3 at point 8 below trap tray 4. Here the hot brine comes into direct contact with hot hydrocarbon liquid from line 10 which extracts mineral-free water from the brine and combines with it to form a complex substantially free of salt. Being lower in specific gravity than brine, the complex accumulates in annular space 9 below trap tray 4. Hot hydrocarbon liquid is introduced through line 10 at some intermediate point in chamber 3: Part of the hydrocarbon liquid combines with demineralized water extracted from the hot brine to form the complex; part passes up through downcomer 5 to heat descending brine; and part contacts and heats the feed hydrocarbon liquid which enters at the bottom of chamber 3, through line 11, at ambient temperature, for example about 70° F.

The liquid streams leaving extractor 1 include: hydrocarbon liquid by way of line 12 at the top of chamber 2, after being contacted by and cooled to the approximate temperature of the brine entering from line 6, for example, about 80° F.; hydrocarbon-water complex by way of line 13 from annular accumulator space 9, at the elevated temperature required to form the complex, for example, about 400–650° F.; and concentrated brine by way of line 14 at the bottom of chamber 3, after being contacted by and cooled to the approximate temperature of the hydrocarbon liquid entering from line 11 for example, 70° F.

The operating pressure of extractor 1 and the temperature of hydrocarbon liquid streams entering through lines 7 and 10 determine the mol percentage of hydrocarbon and water in the complex. These parameters may be adjusted to yield a complex in which the ratio of hydrocarbon to water is about the same as the ratio of hydrocarbon to water in the feed to the synthesis gas generator. The cold hydrocarbon liquid in line 12 is reheated to the desired extraction temperature and recycled back to extractor 1, entering as previously described by way of lines 7 and 10. Heat for this hydrocarbon stream may be provided by means of heater 15, or obtained from heat recovered from the hot effluent product stream leaving the generator reaction zone by means of a waste heat boiler or heat exchanger not shown. The concentrated brine discharged from extractor 1 through line 14 may be discarded or it may be recycled to extractor 1 by means not shown. In some instances it may be profitable to process the discarded concentrated brine to recover the minerals contained therein. The concentration of the brine raffinate leaving extractor 1 after one cycle is about 10 to 20 percent salt.

The hot hydrocarbon-water complex is withdrawn from extractor 1 through line 13 and may be divided into three streams: One stream of hydrocarbon-water complex is directed to separator 16 by way of lines 13 and 17 and heat exchangers 18 and 19; one stream is directed to mixing valve 65 by way of lines 13, 28, valve 39 and line 29; and one stream is directed to synthesis gas generator 50 by way of lines 13, 28, valve 39 and lines 36 or 37 and 38. A major portion of the hydrocarbon-water complex is directed into separator 16 by way of line 17 through indirect heat exchangers 18 and 19 which reduce the temperature of the hydrocarbon-water complex to ambient, about 80° F. while maintaining a pressure of about 1875 p.s.i.g. Under these conditions, the solubility of water in the hydrocarbon liquid is almost zero and separation of the phases takes place in separator 16. Almost pure water settles to the bottom of separator 16 and almost pure hydrocarbon liquid floats to the top. The hydrocarbon liquid withdrawn overhead from separator 16 through line 20 is passed through heat exchanger 18 where it is heated to about the temperature of the complex in line 17. This stream of hot hydrocarbon is then mixed with the hydrocarbon stream withdrawn overhead from extractor 1 through line 12 and sent to heater 15 for further heating and recycling to extractor 1.

If the hydrocarbon to water ratio of the complex in line 13 is too rich for direct feed into synthesis gas generator 50 by way of lines 13, 28, valve 39 and lines 36 and 38 then the hydrocarbon-water complex may be mixed with a portion of mineral free water drawn from the bottom of separator 16 through lines 21 and 22 and the mixture fed to generator 50 by way of lines 37 and 38.

In a similar manner, carbon-complex slurry feed to generator 50 taken from the top of separator 75 may be mixed with a portion of mineral-free water from separator 16. This operation will be described later in connection with the carbon recovery system. The remaining portion of mineral-free water from separator 16 may be passed through line 23 and 24 to flash tower 55 where the pressure is suddenly reduced from about 1875 p.s.i.g. to a much lower pressure. Any hydrocarbon dissolved in the water vaporizes under these conditions, passes off the top of the flash tower through line 25, and may be discarded along with some low pressure steam that is formed. Demineralized water withdrawn from the bottom of flash tower 55 through line 26 is compressed to about 1700–1900 p.s.i.g., the pressure in the gas generator, by pump 60 and fed into the generator quench water system through lines 26 and 27.

A portion of the hydrocarbon-water complex withdrawn from extractor 1 through line 13 may be used in the carbon recovery system that strips carbon particles from the product stream. For this operation, a portion of the complex is passed through lines 13, 28, valve 39 and line 29 into mixing valve or nozzle 65 where it is intimately contacted by a stream of quench water containing 0.1 to 2 percent by weight of dispersed carbon leaving from the bottom of synthesis gas generator 50 through lines 30, 31, pump 70 and line 32 at a high temperature of about 550° F. Pump 70 located between lines 31 and 32, raises the pressure of the quench water to that of the hydrocarbon-water complex in line 29. Carbon separates from the quench water dispersion by forming a slurry with the hydrocarbon-water complex. For the sake of brevity, this slurry is referred to herein as the carbon-complex slurry. Clarified quench water and the carbon-complex slurry are separated by passing the mixed streams through line 33 to separator 75 which may be a relatively quiescent settling zone, a centrifugal separator, or any other known separator means. The high temperature in the system facilitates phase separation by reducing fluid viscosities. Separation of the carbon-complex slurry from the clarified water may be accelerated by the addition of an emulsion breaker. Clarified water from phase separator 75 is sent to flash tower 55 by way of lines 34 and 24. Operation of flash tower 55 has been previously described. The carbon-complex slurry, taken from the top of separator 75, is fed to generator 50 by way of lines 35 and 38, as previously mentioned. This slurry may be also blended with mineral-free water from separator 16 by way of lines 21, 22, and 37 or hydrocarbon-water complex by way of lines 13, 28, valve 39, and line 36.

Uncombined oxygen is fed to generator 50 through line 40. By limiting the oxygen supply, maximum yields of carbon monoxide and hydrogen are obtained. Air, oxygen-enriched air, or essentially pure oxygen in excess of 95 mol percent oxygen may be employed in the process. 99.5 mol percent oxygen is preferred.

The hot gaseous effluent leaving the combustion zone in generator 50 is cooled quickly from a temperature of about 1700–2500° F. to 500–800° F. by passing the hot gas down through dip-leg 41 which discharges below the water level in the quench chamber located at the bottom of generator 50. The cold quench water enters the generator through line 42. Draft tube 43 surrounding dip-leg 41 creates an annulus through which the mixture of gas and entrained water rises vigorously. The gas mixture passes out of the generator 50 by way of line 44 carrying some carbon entrained in the product stream. This carbon is removed by passing the product stream through turbulent mixer 80 where it is contacted by water from line 27. However, most of the carbon is dispersed in quench water that leaves generator 50 through lines 30, 31, pump 70 and line 32. As previously described, this carbon is recovered from the quench water by being contacted with a portion of the complex in mixing valve 65 followed by settling in separator 75. Some hydrocarbon fuels such as fuel oil contain ash. To prevent the accumulation of ash in the quench water, a small amount of the quench water containing ash and some carbon may be discharged from the bottom of generator 50 through lines 30 and 61, heat exchanger 62, and line 63; or this stream may be recycled to extractor 1 by means not shown.

To remove excess water from the mixture of steam and gases leaving mixer 80, the mixture is introduced into separator 85 by way of line 45. Synthesis gas and steam are taken off overhead from separator 85 through line 46, heated to a temperature of 700° F. by means of heat exchanger 90, and fed into catalytic shift converter 92. At a pressure of about 1650 p.s.i.g. and a temperature of about 700° F., carbon monoxide reacts with steam over beds of catalyst in shift converter 92 to produce carbon dioxide and additional hydrogen. The shifted gas is withdrawn from shift converter 92 through line 47, cooled in cooler or heat exchanger 94 to a temperature of about 125° F., and then introduced into separator 96 by way of line 48. At a temperature of 125° F. and a pressure of about 1600 p.s.i.g., the water is condensed from the synthesis gas and is withdrawn from the bottom of separator 96 through line 49. The shifted synthesis gas is withdrawn from the top of separator 96 by way of line 51. Carbon dioxide and other impurities in the synthesis gas may be removed by steps not shown, and the resulting purified hydrogen stream may be used for ammonia synthesis, ore reduction, or for any of a variety of hydrogenation operations.

The water is withdrawn from the bottom of separator 96 through line 49 is raised by pump 52 to a pressure of about 1750 p.s.i.g. and combined with water from flash tower 55 by way of line 26 in which is located pump 60 and a portion of the water from the bottom of separator 85 by way of line 86, pump 53 and line 87 to flow into mixer 80 by way of line 27. Operation of mixer 80 to remove carbon from the product gas stream from generator 50 has been previously described. By means of pump 53, a portion of the water from the bottom of separator 85 is pumped into the generator quench system by way of lines 86 and 42.

The following specific example illustrates the process of this invention.

15,274,000 standard cubic feet per day of synthesis gas comprising about 66 mol percent hydrogen, 30 mol percent carbon monoxide, and 3 mol percent carbon dioxide are made by the process of this invention from the following raw materials:

12,000 lbs. per hour of sea water containing 3.5 percent by weight of salts; 8,212 lbs. per hour of naphtha of 68° API gravity having a gross heating value of 20,420 B.t.u. per lb. and an ultimate analysis by weight of 84.21 percent carbon, 15.69 percent hydrogen and 0.10 percent sulfur; and 113 short tons per day of 99.5 mol percent oxygen.

A hydrocarbon-water complex, for feeding a synthesis gas generator preferably free of catalyst and packing, is prepared in an extractor operated at a pressure of 1900 p.s.i.g. The aforementioned sea water and naphtha feed streams enter the tower at ambient temperature, about 70° F., and flow countercurrent to each other. These streams are heated to a temperature of about 550° F. in the vicinity of the tower trap tray by direct contact with 69,901 lbs. per hour of hot naphtha which enter the tower at a temperature of 580° F. as follows: 15,806 lbs. per hour of naphtha are introduced into the upper chamber of the tower and flow in direct contact with the descending brine; and, 54,095 lbs. per hour of naphtha are introduced into the lower chamber of the tower and flow in direct contact with the upwardly flowing sea water. During extraction, about 3,907 lbs. per hour of naphtha rise through the downcomer in the trap tray connecting the upper and lower chambers.

The composition of the complex formed from mineral-free water extracted from the sea water and combined with naphtha under the conditions prevailing in the vicinity of the annular ring below the tower trap tray is about 86 percent by weight naphtha and 14 percent water.

After exhausting its heat to the feed streams, 19,713 lbs. per hour of naphtha leave at the top of the extractor at a temperature of about 80° F. This stream of naphtha is combined with 50,188 lbs. per hour of naphtha taken off the top of a separator tower which will be described later, reheated to a temperature of 580° F., and recycled back to the extractor.

2400 lbs. per hour of raffinate-sea water containing about 17.5 weight percent salts are cooled from 550° F. to 80° F. by contact with the rising feed stream of cold naphtha introduced near the bottom of the extractor. The concentrated sea water is withdrawn from the bottom of the extractor for discard or for further processing.

68,000 lbs. per hour of hydrocarbon-water complex, comprising, 9,600 lbs. of mineral-free water dissolved in 58,400 lbs. of naphtha are withdrawn from the tower in the vicinity of the annular ring. A major portion, about 58,450 lbs. per hour of complex is cooled by a series of heat exchangers to a temperature of 80° F. At this temperature and pressure, about 1,875 p.s.i.g., the solubility of water in naphtha is reduced to zero and in a separator the complex breaks down into 50,188 lbs. of naphtha and 8,250 lbs. of water containing about 12 lbs. of dissolved naphtha. The naphtha is drawn off the top of the separator, passed through a heat exchanger, combined with the naphtha stream leaving the top of the extraction tower as previously mentioned, reheated to 580° F. and recycled to the extraction tower. 1950 lbs. per hour of clear water from the bottom of the separator are mixed with the carbon-complex slurry from the quench-water carbon recovery system, to be described later, and fed to the synthesis gas generator. The remaining portion of the separated water stream, comprising 6,300 lbs. per hour of mineral-free water and 12 lbs. per hour of dissolved naphtha, is combined with 6,300 lbs. per hour of water from another separator, to be described later, and then passed into a flash tower to remove the naphtha dissolved in the water. 12 lbs. of naphtha and 300 lbs. of steam are vaporized in the flash tower by suddenly reducing the pressure from 1875 p.s.i.g. to about atmospheric and may be discarded from the process. 12,300 lbs. per hour of water from the bottom of the flash tower are pumped into the quench water system of the synthesis gas generator and will be described further. Removal of naphtha in the quench water by this flashing operation prevents the poisoning of the shift conversion catalyst utilized in a subsequent step in the process.

To remove the carbonaceous solid dispersed in the generator quench water, a small portion of the complex withdrawn from the extractor at a temperature of 550° F. and 1875 p.s.i.g., comprising 338 lbs. per hour of water dissolved in 2,050 lbs. per hour of naphtha, is mixed with a 6,300 lbs. per hour portion of quench water containing 35 lbs. of carbonaceous solid leaving from the bottom of the generator. The carbon in the quench water is preferentially attracted to the naphtha in the complex and forms a carbon-complex slurry which is separated from the water in a separator. 2,423 lbs. per hour of carbon-complex slurry drawn off the top of the separator are combined with 1,950 lbs. per hour of mineral-free water and fed to the synthesis gas generator along with 7,162 lbs. per hour of hydrocarbon-water complex from the extractor. 6,300 lbs. per hour of clarified water drawn off the bottom of the carbon-complex slurry separator are combined with 6,312 lbs. per hour of water from the hydrocarbon-water complex separator, as previously described, and sent to the flash tower where 12 lbs. per hour of dissolved naphtha are removed. A 500 lbs. per hour portion of quench water containing 3 lbs. per hour of carbon and a small amount of ash is taken from the bottom of the generator and discarded to prevent build-up of metal salts in the quench system. The metal salts are introduced in minute amounts with the naphtha feed.

The charge to the synthesis gas generator includes 9,585 lbs. per hour of hydrocarbon-water complex comprising 1,350 lbs. per hour of mineral-free water dissolved in 8,200 lbs. per hour of naptha containing 35 lbs. per hour of carbon, plus 1,950 lbs. per hour of mineral-free water. This mixture is reacted in the generator at a pressure of 1,700 p.s.i.g. and a temperature of 2,800° F. with 113 tons per day of 100 percent oxygen contained in an oxygen stream of 99.5 mol percent purity. Impurities in this oxygen stream are primarily nitrogen and argon. All of the naphtha and oxygen are consumed in the reactor plus 500 lbs. per hour of water. Synthesis gas of the following composition and amount is produced in the generator along with 38 lbs. per hour of unconverted carbon.

| Composition | Mol percent | |
|---|---|---|
| | Wet | Dry |
| Carbon monoxide | 37.25 | 41.96 |
| Hydrogen | 46.77 | 52.71 |
| Carbon dioxide | 3.76 | 4.24 |
| Water | 11.25 | |
| Methane | 0.84 | 0.94 |
| Nitrogen and argon | 0.11 | 0.12 |
| Hydrogen sulfide | 0.02 | 0.03 |
| Total | 100.00 | 100.00 |
| MSCF/OD | 12,497 | 11,091 |

The effluent gases leaving the combustion zone are cooled from a temperature of about 1,700–2,500° F. to a temperature of 500–800° F. by direct contact with 41,500 lbs. per hour of water in the quench section of the generator. During quenching, part of the unconverted carbon in the effluent gas is scrubbed therefrom and disperses in the quench water. Removal of this carbon from the quench water by forming a carbon-slurry complex, which is fed back to the synthesis gas generator, has been previously described.

The remainder of the unconverted carbon is scrubbed from the synthesis gas stream, now containing an additional 37,500 lbs. per hour of steam picked up during quenching, by contact with 58,000 lbs. per hour of high speed water. This mixture is then introduced into a separator where the unevaporized water totaling 58,000 lbs. per hour is separated from the synthesis gas. The synthesis gas containing vaporized water (steam), at a temperature of 550° F., is taken overhead, heated to a temperature of 700° F., and then introduced into a catalytic shift converter which is operated at a pressure of 1650 p.s.i.g. and an average temperature of about 700° F. Beds of catalyst disposed through this converter promote the reaction of steam with carbon monoxide in equimolar quantities to produce carbon dioxide and additional hydrogen. A total of 8300 lbs. per hour of water are consumed in the shift converter. The shifted gas is cooled to about 125° F. and introduced into a separator vessel. There at a pressure of 1,600 p.s.i.g., the unconverted water in the gas stream is condensed and withdrawn from the bottom at the rate of 29,200 lbs. per hour. This water is combined with 12,300 lbs. per hour of water from the bottom of the flash tower, and 16,500 lbs. per hour of water from the bottom of the separator following the synthesis gas high speed carbon scrubber to total 58,000 lbs. per hour of water used in the operation of said high speed scrubber. An additional 41,500 lbs. per hour of water from the aforementioned separator is recycled to the quench ring of the synthesis gas generator.

The shifted synthesis gas withdrawn from the top of the separator following the shift converter in the amount of 15,274,000 standard cubic feet per operating day comprises the following molal composition, on a dry basis:

| Composition: | Percent |
|---|---|
| Carbon monoxide | 3.08 |
| Hydrogen | 65.65 |
| Carbon dioxide | 30.48 |
| Methane | 0.68 |
| Nitrogen+argon | 0.09 |
| Hydrogen sulfide | 0.02 |
| Total | 100.00 |

After removal of carbon dioxide and other impurities the resulting hydrogen stream may be used in ammonia synthesis or any of a variety of hydrogenation operations.

A second specific example is presented in which the composition of the hydrocarbon-water complex is proper for direct feeding to the synthesis gas generator without the addition of supplemental water or hydrocarbon.

In this example the process flow is the same as that followed in the first example with the exception that no supplemental water is used to dilute the complex feed stream to the generator. Furthermore, the same quantity of shifted synthesis gas of identical composition is produced from the same amount of raw sea water and naphtha. By operating the extractor at a temperature of 605° F. in the vicinity of the trap tray, instead of at 550° F. as in the first example, a stream of hydrocarbon-water complex having a composition of 28 weight percent water dissolved in 72% naphtha may be drawn off and fed directly into the generator.

The extraction temperature of 605° F. in the vicinity of the trap tray is maintained by heating the naptha and sea water feedstreams with a total of 36,473 lbs. per hour of naphtha, at a temperature of 665° F.–7,243 lbs. per hour of naptha in the upper chamber and 29,230 lbs. per hour of naphtha in the lower chamber. Within the extractor some 12,742 lbs. per hour of naptha rise through the downcomer in the trap tray connecting the upper and lower chambers. The stream of hydrocarbon-water complex drawn off the extractor contains 9,600 lbs. per hour of mineral-free water dissolved in 24,700 lbs. per hour of naptha.

After exhausting its heat to the feed streams, 19,985 lbs. per hour of naptha leave the top of the extractor at a temperature of about 80° F. This stream of naptha is combined with 16,488 lbs. per hour of naptha at a temperature of 575° F. coming from a separator by way of a heat exchanger to be further mentioned. The combined naptha streams are heated to 665° F. and recycled to the extraction tower. Heat requirements are about 8,825,000 B.t.u. per hour.

About two-thirds of the stream of complex leaving the extraction tower is cooled from 605° F. to a temperature of 340° F. by exchanging heat with the aforementioned 16,488 lbs. per hour of naptha coming from said separator. The complex is further cooled to a temperature of 80° F. and passed into said separator where 6,300 lbs. per hour of mineral-free water containing 12 lbs. of naptha are drawn off the bottom and directed to a flash tower in the same manner as described in the first example.

The remainder of the processing is similar with respect to operating conditions and flow rates as described in the first example.

The process of the invention has been described generally and by examples with reference to hydrocarbon and saline water feedstocks of particular compositions for purposes of clarity and illustration only. It will be apparent to those skilled in the art from the foregoing that various modifications of the process and materials disclosed herein can be made without departure from the spirit of the invention.

I claim:
1. A process for the production of synthesis gas which comprises, intimately mixing a stream of liquid hydrocarbon fuel with a stream of brine at a pressure in the range of about 1500 to 2650 p.s.i.g. and a temperature of about 400 to 650° F., extracting desalted water from said brine stream by means of said stream of liquid hydrocarbon fuel at said temperature and pressure thereby forming a stream of liquid hydrocarbon-water complex containing about 0.2 to 1.0 part by weight of desalted water for each part by weight of liquid hydrocarbon fuel and a stream of concentrated brine, separating said stream of liquid hydrocarbon-water complex from said stream of concentrated brine, and introducing at least a portion of said separated liquid hydrocarbon-water complex in liquid phase at substantially the same temperature and pressure as when formed directly into the reaction zone of a synthesis gas generator, and reacting said complex with an oxygen-rich gas selected from the group consisting of air, oxygen-enriched air, or essentially pure oxygen in excess of 95 mole percent oxygen at a temperature in the range of about 1800 to 3500° F. and a pressure in the range of about 100 to 2600 p.s.i.g. to produce said stream of synthesis gas comprising hydrogen and carbon monoxide and minor amounts of entrained carbonaceous solid.

References Cited
UNITED STATES PATENTS

| | | | |
|---|---|---|---|
| 1,228,818 | 6/1917 | Pictet | 48—215 |
| 2,051,363 | 8/1936 | Beekley | 252—373 |
| 2,465,235 | 3/1949 | Kubicek. | |
| 2,904,511 | 9/1959 | Donath. | |
| 2,980,523 | 4/1961 | Dille et al. | 48—215 |
| 2,992,906 | 2/1961 | Guptill | 48—215 XR |
| 2,999,741 | 9/1961 | Dille et al. | 48—215 XR |
| 3,010,813 | 11/1961 | Clarke et al. | 48—215 |
| 3,044,179 | 7/1962 | Chapman et al. | |
| 3,097,082 | 7/1963 | Guptill. | |
| 3,147,093 | 2/1964 | Dille et al. | |
| 3,232,727 | 2/1966 | Guptill et al. | |
| 3,232,728 | 2/1966 | Reynolds | 252—373 XR |
| 3,236,747 | 2/1966 | Margiloff. | |
| 3,394,055 | 7/1968 | Ludwig | 203—100 XR |

LEON ZITVER, Primary Examiner

H. T. MARS, Assistant Examiner

U.S. Cl. X.R.

23—212; 210—59, 21, 22; 252—376; 260—676